No. 790,498. PATENTED MAY 23, 1905.
H. HAMELLE.
LUBRICATING APPARATUS.
APPLICATION FILED DEC. 31, 1903.

2 SHEETS—SHEET 1.

WITNESSES:
Fred White
René Bruine

INVENTOR:
Henry Hamelle,
By his Attorneys

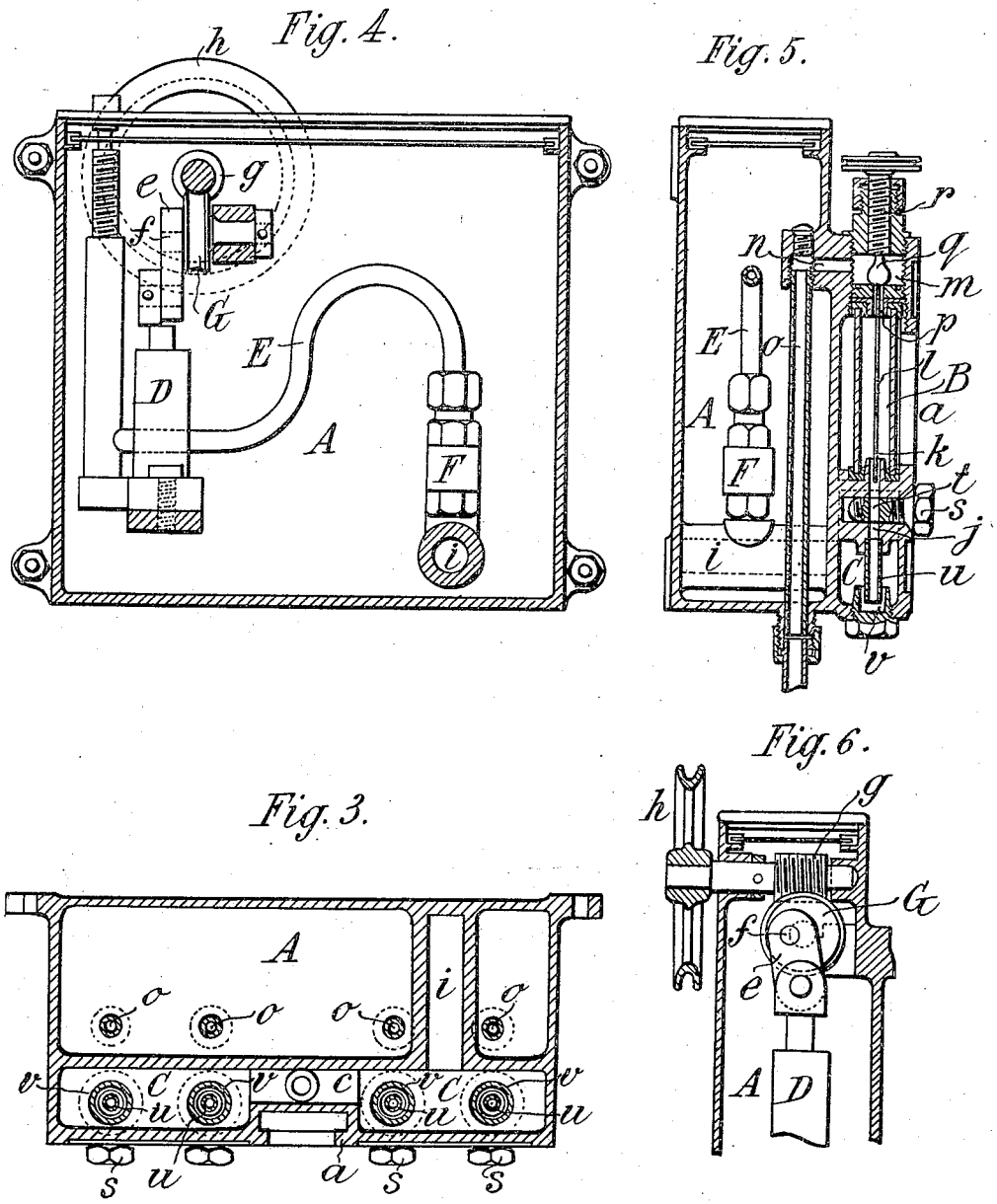

No. 790,498.                                                                    Patented May 23, 1905.

UNITED STATES PATENT OFFICE.

HENRY HAMELLE, OF PARIS, FRANCE.

LUBRICATING APPARATUS.

SPECIFICATION forming part of Letters Patent No. 790,498, dated May 23, 1905.

Application filed December 31, 1903. Serial No. 187,260.

*To all whom it may concern:*

Be it known that I, HENRY HAMELLE, a citizen of the Republic of France, residing in Paris, France, have invented certain new and useful Improvements in Lubricating Apparatus, of which the following is a specification.

This invention relates to lubricating apparatus, and has for its object to provide a lubricator particularly applicable for the lubrication of the mechanism of motor-vehicles. It is so constructed that when the vehicle is stopped the water from the sight-tubes cannot descend. Further, it is provided with regulating mechanism within easy reach of the chauffeur.

Figure 1:
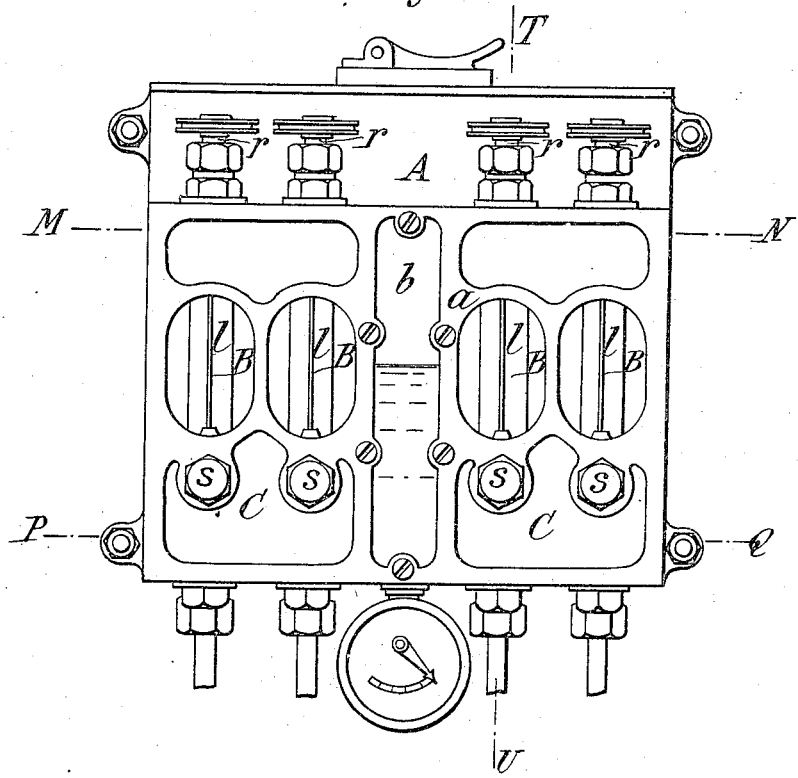
Figure 2:
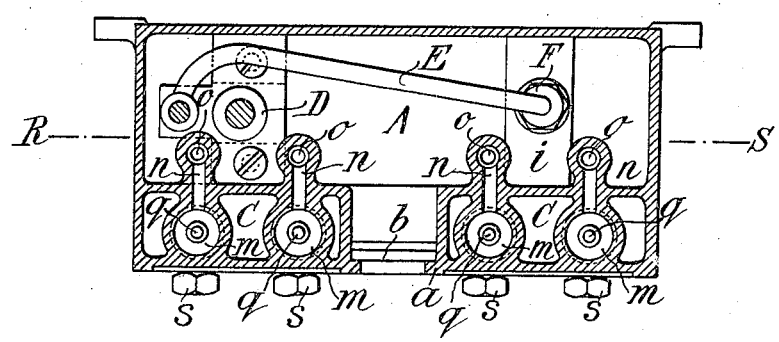

Figure 1 is a front elevation of my lubricating apparatus. Figs. 2 and 3 are horizontal sections on lines M N and P Q, respectively, of Fig. 1. Fig. 4 is a vertical section on line R S of Fig. 2. Fig. 5 is a transverse section on line T U of Fig. 1, and Fig. 6 is a part-sectional view illustrating the method of operating the compressing-pump.

My lubricating apparatus comprises a reservoir A, constituting the oil-tank, formed at the center with a vertical projecting part $a$, provided with a window $b$ to allow of the level of the oil in the tank being ascertained. At each side of the projecting part $a$ are sight-tubes B, arranged above two chambers C, communicating with each other at $c$. In the tank A is a pump D, which forces oil through a pipe E to a storage-box F, which opens into one of the chambers C. This pump is operated by a link $e$, actuated by an eccentric $f$ on a worm-wheel G, which gears with a worm $g$, the shaft of which is provided at one end with a grooved pulley $h$, driven by any suitable means from the motor-vehicle. The oil passes through a conduit $i$ into one of the chambers C, fills both chambers, which are, as above described, in communication through $c$. Thence the oil rises into the sight-tubes B, which are filled with water, by passing through an aperture $j$, which opens into a nozzle $k$. A central needle or rod $l$, one end of which is within the nozzle, serves to guide the drop of oil which rises into the water in order to pass through the upper part into the space $m$, connected by a conduit $n$ with a tube $o$, which communicates with the parts to be lubricated. The upper opening $p$ of the sight-tubes can be closed more or less by a valve $q$ on a threaded rod $r$, provided with the said guide needle or rod $l$. The chauffeur can easily operate the knob or button carried by the threaded rod $r$ to regulate as may be required the flow of oil to any one of the sight-tubes.

Between the chamber C and the nozzle $k$ for the oil-supply is a screw $s$, provided with a transverse opening $t$. When the screw is screwed down to the bottom, as shown in the drawings, there is a free passage for the oil. When it is desired to close the communication, the screw is turned a quarter of a turn, and the transverse hole then occupies a position at right angles to the orifice $j$. During the normal operation of the lubricator the screw $s$ is screwed home and is under the best conditions of hermeticity.

The oil does not pass directly from the chamber C to the sight-tube, but through a tube $u$, which dips into a cup $v$. This arrangement is provided for the following purpose: When the vehicle stops, and the oil consequently ceases to be forced in, the water from the sight-tubes tends by reason of its density to descend into the chamber C to there take the place of the oil, which, on the contrary, tends to rise into the sight-tubes. The result would be that the tubes would become filled with oil, and upon restarting too large a quantity of oil would be forced into the pipes leading to the parts to be lubricated, thereby entailing a considerable loss of oil. With the arrangement shown a little water descends from the sight-tubes through the tube $u$ into the cup $v$; but the descent of the water stops when it reaches the lower end of the tube $u$.

I claim—

1. In a lubricating apparatus, means for forcing oil therefrom, a cup through which the oil passes, and a sight-tube having a tubular portion connecting therewith and extending into said cup, whereby to prevent the descent of the water from said tube when said oil-forcing means ceases to operate.

2. In a lubricating apparatus, the combination of a sight-tube adapted to contain water, through which the oil feeds, an upper screw the lower end of which forms a valve-face, and a guide-rod carried by said screw and extending longitudinally of said tube and down to the lower orifice thereof.

3. In a lubricating apparatus, a reservoir formed as a box or tank, a sight-tube at each side of one face thereof connected therewith and adapted to receive oil therefrom, said reservoir having a projecting portion on the same face and intermediate of said sight-tubes, and said portion being connected with said reservoir and having a transparent wall through which the level of oil in said reservoir may be observed.

In witness whereof I have hereunto signed my name, this 16th day of December, 1903, in the presence of two subscribing witnesses.

HENRY HAMELLE.

Witnesses:
JULES ARMENGAUD, Jeune.,
HANSON C. COXE.